US009329860B2

(12) United States Patent
Iyer et al.

(10) Patent No.: US 9,329,860 B2
(45) Date of Patent: May 3, 2016

(54) SPECIFYING DATA IN A STANDARDS STYLE PATTERN OF SERVICE-ORIENTED ARCHITECTURE (SOA) ENVIRONMENTS

(71) Applicant: INTERNATIONAL BUSINESS MACHINES CORPORATION, Armonk, NY (US)

(72) Inventors: Sreekanth R. Iyer, Karnataka (IN); Sandeep R. Patil, Vimannagar (IN); Sri Ramanathan, Lutz, FL (US); Gandhi Sivakumar, Bentleigh (AU); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/618,212

(22) Filed: Feb. 10, 2015

(65) Prior Publication Data

US 2015/0160943 A1   Jun. 11, 2015

Related U.S. Application Data

(63) Continuation of application No. 13/417,977, filed on Mar. 12, 2012, now Pat. No. 8,990,271.

(51) Int. Cl.
*G06F 12/00* (2006.01)
*G06F 17/30* (2006.01)
*G06F 9/44* (2006.01)

(52) U.S. Cl.
CPC ... *G06F 8/71* (2013.01); *G06F 8/31* (2013.01)

(58) Field of Classification Search
CPC ..... G06Q 10/06; G06F 17/2247; G06F 21/00; G06F 21/30; H04L 63/20
USPC .......................................................... 707/821
See application file for complete search history.

(56) References Cited

U.S. PATENT DOCUMENTS 6,275,852 B1   8/2001   Filepp et al.
7,747,590 B2   6/2010   Rodriguez et al.
(Continued)

OTHER PUBLICATIONS

Lubell, Joshua. "Documenting and Implementing Guidelines with Schematron", Presented at Balisage: The Markup Conference 2009, Montreal, Canada, Aug. 11-14, 2009. In Proceedings of Balisage: The Markup Conference 2009_ Balisage Series on Markup Technologies, vol. 3 (2009)_doi:l0.4242/BalisageVo13_LubellOl, 13 pages.

*Primary Examiner* — Hosain Alam
*Assistant Examiner* — Nicholas Allen
(74) *Attorney, Agent, or Firm* — Matthew Chung; Andrew M. Calderon; Roberts Mlotkowski Safran & Cole, P.C.

(57) ABSTRACT

An approach for specifying data in a standards style pattern of Service-Oriented Architecture (SOA) environments is provided. The approach implemented in a computer infrastructure, includes defining an interface including one or more local data elements and one or more references to one or more common data elements, of a service, the one or more common data elements being defined in a library for a plurality of services. The approach further includes configuring a data definition file (DDF) which indicates whether each of the one or more local data elements and the one or more common data elements is mandatory for the service. The approach further includes validating one or more data elements from a consumer as mandatory for the service based on the configured DDF.

19 Claims, 4 Drawing Sheets

(56) References Cited

U.S. PATENT DOCUMENTS

| | | |
|---|---|---|
| 8,069,435 B1 | 11/2011 | Lai |
| 8,346,803 B2 | 1/2013 | Chang |
| 8,856,380 B2* | 10/2014 | DelloStritto .......... G06F 13/387 455/557 |
| 2004/0068731 A1 | 4/2004 | Davis et al. |
| 2005/0198154 A1 | 9/2005 | Xie et al. |
| 2005/0232046 A1* | 10/2005 | Mamou ................. G06Q 10/10 365/220 |
| 2005/0251527 A1 | 11/2005 | Phillips et al. |
| 2005/0262192 A1* | 11/2005 | Mamou ................. G06Q 10/10 709/203 |
| 2005/0262194 A1 | 11/2005 | Mamou et al. |
| 2006/0029054 A1 | 2/2006 | Breh et al. |
| 2006/0036941 A1 | 2/2006 | Neil |
| 2006/0069717 A1 | 3/2006 | Mamou et al. |
| 2006/0200753 A1* | 9/2006 | Bhatia et al. ................ 715/505 |
| 2006/0206861 A1* | 9/2006 | Shenfield et al. ............ 717/106 |
| 2007/0011126 A1 | 1/2007 | Conner et al. |
| 2007/0050407 A1 | 3/2007 | Chen et al. |
| 2007/0105589 A1 | 5/2007 | Lu |
| 2007/0150574 A1 | 6/2007 | Mallal et al. |
| 2008/0120129 A1 | 5/2008 | Seubert et al. |
| 2008/0133303 A1 | 6/2008 | Singh et al. |
| 2008/0282219 A1 | 11/2008 | Seetharaman et al. |
| 2009/0040947 A1* | 2/2009 | Krivopaltsev ................. 370/255 |
| 2009/0138940 A1 | 5/2009 | Liu et al. |
| 2009/0183117 A1* | 7/2009 | Chang ........................... 715/810 |
| 2009/0249362 A1 | 10/2009 | Lindemann et al. |
| 2009/0265615 A1* | 10/2009 | Hatori et al. ................. 715/239 |
| 2009/0281996 A1 | 11/2009 | Liu et al. |
| 2010/0023471 A1 | 1/2010 | Baldwin et al. |
| 2010/0077068 A1 | 3/2010 | Saha et al. |
| 2010/0082497 A1 | 4/2010 | Biesemann et al. |
| 2010/0088326 A1 | 4/2010 | Chen et al. |
| 2010/0161627 A1 | 6/2010 | Vossen et al. |
| 2010/0218041 A1 | 8/2010 | Tenenti |
| 2010/0299438 A1* | 11/2010 | Zimmerman et al. ........ 709/226 |
| 2011/0184990 A1 | 7/2011 | Murphy et al. |
| 2012/0016910 A1 | 1/2012 | Schlarb et al. |
| 2012/0265324 A1 | 10/2012 | Colombo et al. |
| 2013/0019078 A1* | 1/2013 | Sandler ........................ 711/163 |
| 2014/0123061 A1* | 5/2014 | Bennett .................. G06F 19/30 715/808 |

\* cited by examiner

FIG. 2

SPECIFYING DATA IN A STANDARDS STYLE PATTERN OF SERVICE-ORIENTED ARCHITECTURE (SOA) ENVIRONMENTS

TECHNICAL FIELD

The present invention generally relates to Service-Oriented Architecture (SOA) environments, and more particularly, to specifying data in a standards style pattern of SOA environments.

BACKGROUND

A Service-Oriented Architecture (SOA) is a set of principles and methodologies for design and developing software in the form of interoperable services. SOA also provides a way for consumers of services, such as web-based applications, to be aware of available SOA services. For example, disparate departments within a company may develop and deploy SOA services. Their respective clients can use a defined interface to access the SOA services.

Representing service interface elements in SOA environments can be done via two patterns: an in line pattern and a standards style pattern. Regarding the in line pattern, all elements (e.g., a product, product items, etc.) pertaining to a service (e.g., an online store) may be manifested (e.g., appear) in a same interface, and only the interface may be delivered via a Web Services Description Language (WSDL) file from the service to a consumer. Regarding the standards style pattern, common elements (e.g., a date, a version, and/or a priority, of a service) between services may reside in a library, and the individual services may refer to such common elements. Accordingly, in the standards style pattern, the library including the common elements and the interface of specific service elements (e.g., the WSDL file) may be delivered from a service to a consumer. Due to its reusability and easier implementation, the standards style pattern is often preferred over the in line pattern.

However, the standards style pattern has a direct impact on data optionality, e.g., an ability for service interface elements to be deemed optional instead of mandatory. With respect to the in line pattern, representing data optionality is not difficult as all of the elements are strongly-typed (e.g., manifested in an interface for a specific service), localized, and mandatory. However, with respect to the standards style pattern, representing data optionality creates conflict of interest issues as common elements need to be shared across multiple services. For example, while some of these services may deem the common elements to be optional, others of these services may deem the common elements to be mandatory.

Due to such conflict of interest issues, in the standards style pattern, services may be forced to manifest all of their elements as optional, and specified naming and design rules (e.g., Schematron rules) on the elements are rendered useless. Further, since the elements are required to be optional, a parser of a service cannot validate the elements in service messages as optional or mandatory. Instead, validation is subsequently done at mediation maps of the service. This imposes the risk of absorbing invalid service messages at later layers (e.g., mediation layers) of the service and burdening these later layers, instead of filtering the invalid service messages as early as possible.

SUMMARY

In a first aspect of the invention, a method implemented in a computer infrastructure, includes defining an interface including one or more local data elements and one or more references to one or more common data elements, of a service, the one or more common data elements being defined in a library for a plurality of services. The method further includes configuring a data definition file (DDF) which indicates whether each of the one or more local data elements and the one or more common data elements is mandatory for the service. The method further includes validating one or more data elements from a consumer as mandatory for the service based on the configured DDF.

In another aspect of the invention, a system implemented in hardware, includes a computer infrastructure operable to define an interface including one or more local data elements and one or more references to one or more common data elements, of a service, the one or more common data elements being defined in a library for a plurality of services. The computer infrastructure is further operable to configure a data definition file (DDF) including one or more data optionality attributes which indicate whether each of the one or more local data elements and the one or more common data elements is optional for the service. The computer infrastructure is further operable to invalidate one or more data elements from a consumer device as optional for the service based on the configured DDF.

In an additional aspect of the invention, a computer program product includes a tangible computer usable storage medium having readable program code embodied in the tangible computer usable storage medium. The computer program product includes at least one component operable to define an interface including one or more local data elements and one or more references to one or more common data elements, of a service, the one or more common data elements being defined in a library for a plurality of services. The at least one component is further operable to configure a data definition file (DDF) which indicates whether each of the one or more local data elements and the one or more common data elements is mandatory for the service. The at least one component is further operable to validate one or more data elements from a consumer as mandatory for the service based on the configured DDF.

In another aspect of the invention, a method of specifying data in a standards style pattern of Service-Oriented Architecture (SOA) environments, includes providing a computer infrastructure operable to receive, from a service, an interface including one or more local data elements and one or more references to one or more common data elements, of the service, the one or more common data elements being defined in a library for a plurality of services. The computer infrastructure is further operable to receive, from the service, the library, and receive, from the service, a data definition file (DDF) which indicates whether each of the one or more local data elements and the one or more common data elements is mandatory for the service. The computer infrastructure is further operable to provide a consumer the one or more local data elements and the one or more common data elements for use of the service based on the interface, the library, and the DDF. The computer infrastructure is further operable to send, to the service, one or more data elements from the consumer such that the service validates the one or more data elements as mandatory for the service based on the DDF.

In a further aspect of the invention, a computer system for specifying data in a standards style pattern of Service-Oriented Architecture (SOA) environments, includes a CPU, a computer readable memory and a tangible computer readable storage media. First program instructions define an interface including one or more local data elements and one or more references to one or more common data elements, of a service, the one or more common data elements being defined in a library for a plurality of services. Second program instructions configure a data definition file (DDF) which indicates whether each of the one or more local data elements and the one or more common data elements is mandatory for the service, after the defining of the interface. Third program instructions validate one or more data elements from a consumer as mandatory for the service based on the configured DDF. Fourth program instructions invalidate the one or more data elements as optional for the service based on the configured DDF. The first, second, third, and fourth program instructions are stored on the tangible computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of embodiments of the present invention.

FIG. 2 shows an illustrative interface of service elements in a standards style pattern in accordance with aspects of the invention;

DETAILED DESCRIPTION

Figure 1:
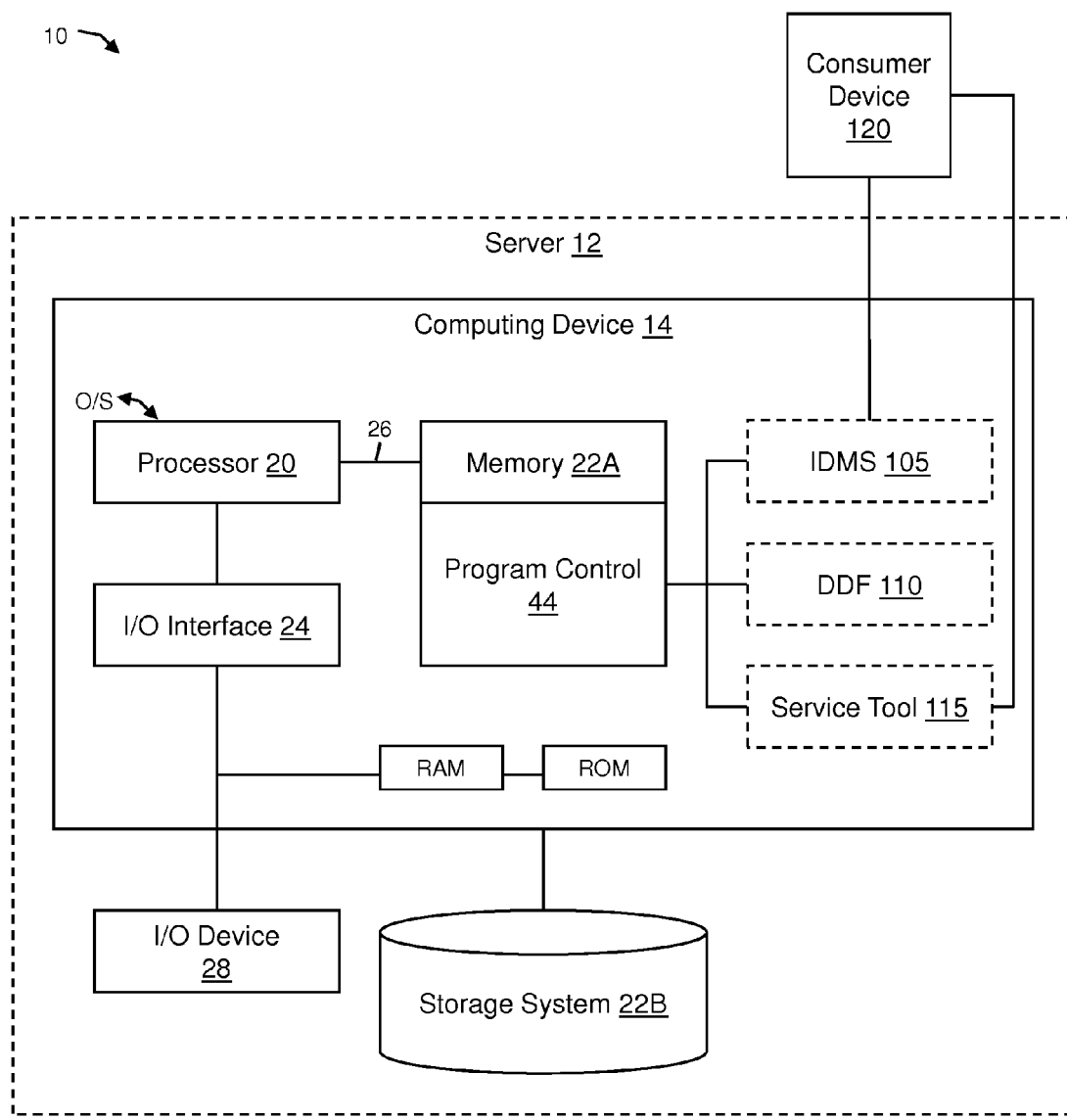
FIG. 1 shows an illustrative environment for implementing steps in accordance with aspects of the invention.

The present invention generally relates to Service-Oriented Architecture (SOA) environments, and more particularly, to specifying data in a standards style pattern of SOA environments. More specifically, aspects of the present invention include an Intelligent Data Manager for SOA (IDMS) which can enable a user to configure a data definition file (DDF) including one or more interface elements (e.g., data) of a service and their data optionality attributes during service specification, realization, and/or implementation phases. The IDMS may further link one or more common interface elements used by the service and other services with the DDF. In this way, a parser of the service in an earlier ingress or reception layer may validate incoming service messages, namely, their service elements as mandatory or optional for the service based on the DDF, and prevent invalid service messages from reaching later layers of the service.

More specifically, in embodiments, the IDMS can be used by a user or service designer to define one or more specific elements (e.g., a product, product items, and/or any type of data) of a SOA service (e.g., an online store and/or any type of SOA service). The elements may be defined in an interface (e.g., a Web Services Description Language (WSDL) file) for the service and in a standards style pattern. That is, local elements of the service (e.g., elements defined for only the single service) may be defined (e.g., detailed) in the interface, while common elements of the service (e.g., elements defined for multiple services) may be defined in a library (e.g., a WSDL file) of common elements for multiple services and may be referred to (e.g., not detailed) in the interface. While the local elements defined in the interface may be defined to be mandatory for the service in respective attributes of the local elements, the common elements defined in the library cannot be defined to be mandatory for any services since the common elements may be mandatory for some services but optional for other services.

When the service elements are defined in the interface and in the standards style pattern, in embodiments, the IDMS can prompt the user to configure, via the IDMS, a data definition file (DDF) (e.g., a WSDL file) for the service to define the service elements including the local elements and the common elements. More specifically, the IDMS may configure the DDF to define a data optionality attribute of each of the service elements, e.g., whether each of the service elements is mandatory or optional for the service. To provide a service element interface to a consumer device, the IDMS may transfer the defined interface, the library of the common elements, and the defined DDF to the consumer device. The consumer device and/or the IDMS may create one or more virtual links between the common elements referred to in the interface and the service elements defined in the DDF.

In embodiments, the consumer device can provide a consumer, e.g., a graphical user interface (GUI) for use of the SOA service based on the interface and the DDF. The consumer device may further transfer the service elements and their respective values entered by the consumer in a service message to the service. The service may validate (e.g., approve and use) or invalidate (e.g., disapprove and remove) the service message. More specifically, in embodiments, the service may validate as mandatory for the service or invalidate as optional for the service, the service elements in the service message based on the interface and the DDF. To accomplish this, for example, when the service is parsing a common element referred to in the service message and the interface, the IDMS may connect the service to the same common element, if available, defined in the DDF based on the created virtual links between the common elements referred to in the interface and the service elements defined in the DDF. When the same common element is defined in the DDF as mandatory, the service may validate the common element referred to in the service message and the interface as mandatory. Otherwise, the service may invalidate the common element referred to in the service message and the interface as optional.

Advantageously, the service may validate a service message for data optionality at an earlier stage (e.g., a reception layer) of the service. In addition, the service may also invalidate an incomplete or incorrect service message for data optionality at an earlier stage of the service, thus enabling earlier upstream filtering of service messages.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In embodiments, the server 12 may include any mobile computing device, such as a mobile phone, a laptop, a video camera, etc. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handset, keyboard, etc.

In general, the processor 20 executes computer program code (e.g., program control 44), which can be stored in the memory 22A and/or storage system 22B. Moreover, in accordance with aspects of the invention, the program control 44 controls an intelligent data manager for Services-Oriented Architecture (SOA) (IDMS) 105, e.g., the processes described herein. The IDMS 105 can be implemented as one or more program code in the program control 44 stored in memory 22A as separate or combined modules. Additionally, IDMS 105 may be implemented as separate dedicated processors or a single or several processors to provide the function of this tool. Moreover, it should be understood by those of ordinary skill in the art that the IDMS 105 is used as a general descriptive term for providing the features and/or functions of aspects of the present invention. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In embodiments, the IDMS 105 can be implemented in service specification, realization, and/or implementation tools, such as, e.g., IBM WebSphere® Integration Developer (WID) tools, IBM Rational® Software Architect (RSA) tools, and IBM WebSphere® Process Server (WPS) tools (IBM, WebSphere, and Rational are trademarks of International Business Machines Corporation registered in many jurisdictions worldwide). The IDMS 105 may be used by a user or service designer to define one or more specific elements (e.g., a product, product items, and/or any type of data) of a SOA service (e.g., an online store and/or any type of SOA service). The elements may be defined in an interface (e.g., a Web Services Description Language (WSDL) file) for the service and in a standards style pattern. That is, local elements of the service (e.g., elements defined for only the single service) may be defined (e.g., detailed) in the interface, while common elements of the service (e.g., elements defined for multiple services) may be defined in a library (e.g., a WSDL file) of common elements for multiple services and may be referred to (e.g., not detailed) in the interface. While the local elements defined in the interface may be defined to be mandatory for the service in respective attributes of the local elements, the common elements defined in the library cannot be defined to be mandatory for any services since the common elements may be mandatory for some services but optional for other services.

Figure 2:
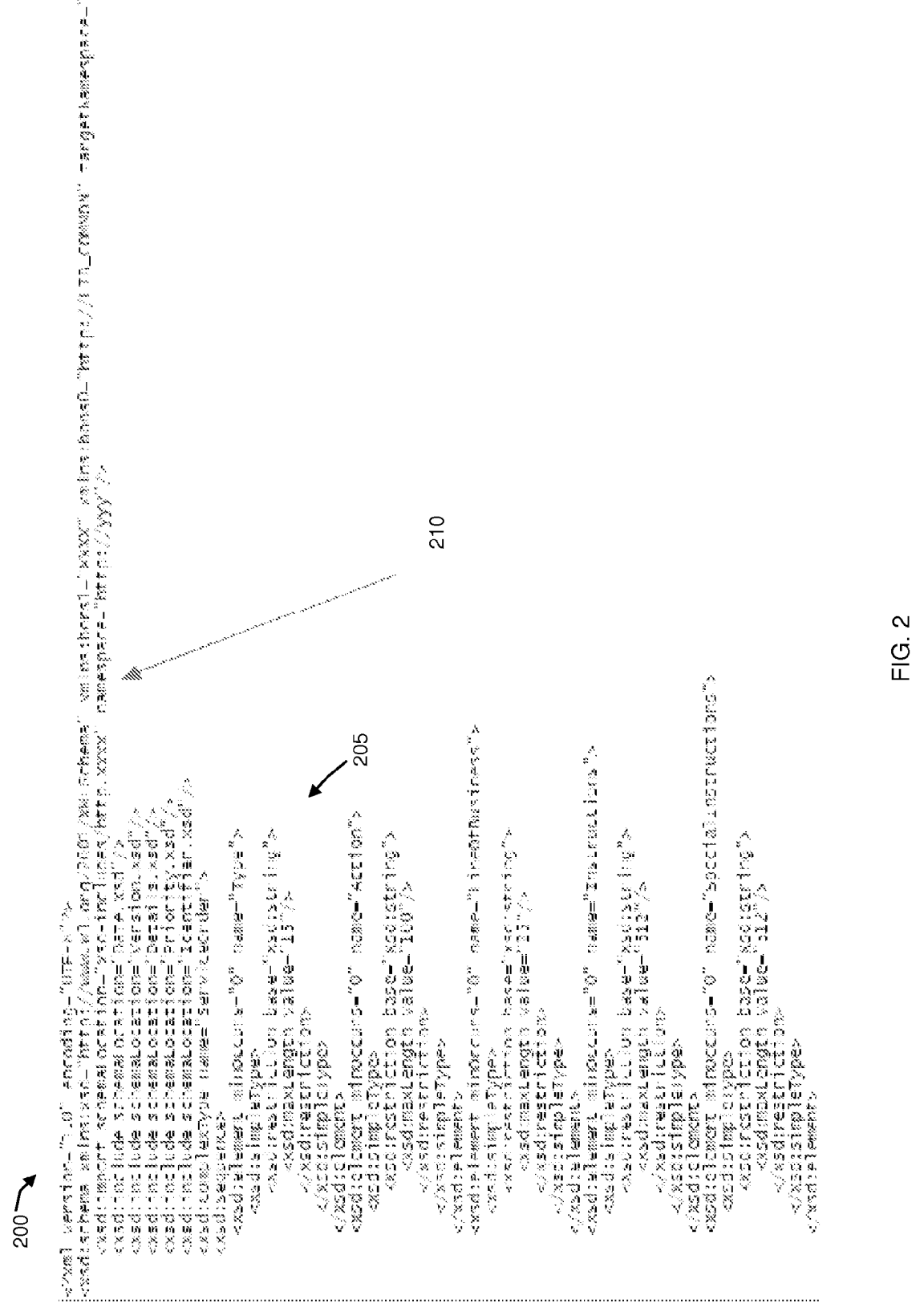

Referring to FIG. 2, for example, an illustrative interface 200 of one or more service elements in a standards style pattern in accordance with aspects of the invention is shown. More specifically, in embodiments, the interface 200 can include a Web Services Description Language (WSDL) file defined by a user or service designer via the IDMS 105 in FIG. 1. The interface 200 may include one or more defined (e.g., detailed) local elements 205 of a particular service, e.g., transmitting a service order. For example, the local elements 205 may include a type, an action, a line of business, instructions, and/or special instructions, of the service. Each of the local elements 205 may be a string of 25 characters (as an example), and may be defined to be mandatory for the service in an attribute of each of the local elements 205.

In embodiments, the interface 200 may further include one or more common elements 210 of the particular service and one or more other services. The one or more common elements 210 may be defined in a library (e.g., a WSDL file) of common elements for multiple services that is located at a particular location (e.g., "xsd-includes/http.xxx") and is referred to (e.g., not detailed) in the interface 200. For example, the common elements 210 may include references to a date, a version, details, a priority, an identifier, of the particular service and other services such that the referenced common elements 210 may be imported from the library of the common elements 210. The common elements 210 defined in the library should be defined to be optional to the service and the other services since the common elements 210 may be mandatory for some services but optional for others.

Referring back to FIG. 1, in embodiments, when the service elements are defined in the interface and in the standards style pattern, the IDMS 105 can prompt the user to configure, via the IDMS 105, a data definition file (DDF) 110 for the service to define the service elements including the local elements and the common elements. More specifically, in embodiments, the IDMS 105 may configure the DDF 110 to define a data optionality attribute of each of the service elements, e.g., whether each of the service elements is mandatory or optional for the service. The DDF 110 may include a WSDL file. The IDMS 105 may store the DDF 110 in, e.g., the memory 22A and/or the storage system 22B.

In accordance with further aspects of the invention, the environment 10 can further include a service tool 115 and a consumer device 120. The service tool 115 may provide the SOA service for which the interface and the DDF 110 are defined, and other SOA services. The service tool 115 may be implemented in the computing device 14 and/or controlled by the program control 44. The consumer device 120 may include any type of user device, such as, for example, a smartphone, a laptop, a desktop, etc.

In embodiments, to provide a service element interface to the consumer device 120, the IDMS 105 can transfer the defined interface (e.g., the first WSDL file), the library of the common elements (e.g., the second WSDL file), and the defined DDF 110 (e.g., the third WSDL file) to the consumer device 120. In additional embodiments, the IDMS 105 may also be implemented in the consumer device 120 (e.g., as a client application), and may receive the defined interface, the library, and the defined DDF 110 from the computing device 14. The consumer device 120 and/or the IDMS 105 residing in the consumer device 120 may store the received interface, the library, and the received DDF 110 in memory of the consumer device 120. The consumer device 120 and/or the IDMS 105 residing in the computing device 14 and/or the consumer device 120 may create one or more virtual links between the common elements referred to in the interface and the service elements defined in the DDF 110.

In accordance with further aspects of the invention, the consumer device 120 can provide a consumer, e.g., a graphical user interface (GUI) for use of the SOA service based on the interface of the mandatory service elements and the DDF 110 of the service elements. In response, the consumer, via the GUI, may enter a value for each of the service elements. The consumer device 120 may transfer these service element values in a service message (e.g., in the Extensible Markup Language (XML)) to the service tool 115 which may validate (e.g., approve and use) or invalidate (e.g., disapprove and remove) the service message. More specifically, in embodiments, the service tool 115 may validate as mandatory for the service or invalidate as optional for the service, the service elements in the service message based on the interface defined by the IDMS 105 and the DDF 110.

To accomplish this, in embodiments, the service tool 115 may work with the IDMS 105 when the service tool 115 is parsing a common element referred to in the service message and the interface. The IDMS 105 may connect the service tool 115 to the same common element, if available, defined in the DDF 110 based on the created virtual links between the common elements referred to in the interface and the service elements defined in the DDF 110. The service tool 115 may validate or invalidate the common element referred to in the service message and the interface based on the same common element being defined in the DDF 110, namely, whether the common element is mandatory or optional for the service. When the same common element is defined in the DDF 110 as mandatory, the service tool 115 may validate the common element referred to in the service message and the interface as mandatory. Otherwise, the service tool 115 may invalidate the common element referred to in the service message and the interface as optional.

Advantageously, the service tool 115 may validate a service message for data optionality at an earlier stage (e.g., a reception layer) of the service. In addition, the service tool 115 may also invalidate an incomplete or incorrect service message for data optionality at an earlier stage of the service, thus enabling earlier upstream filtering of service messages.

Still referring to FIG. 1, the computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 3:
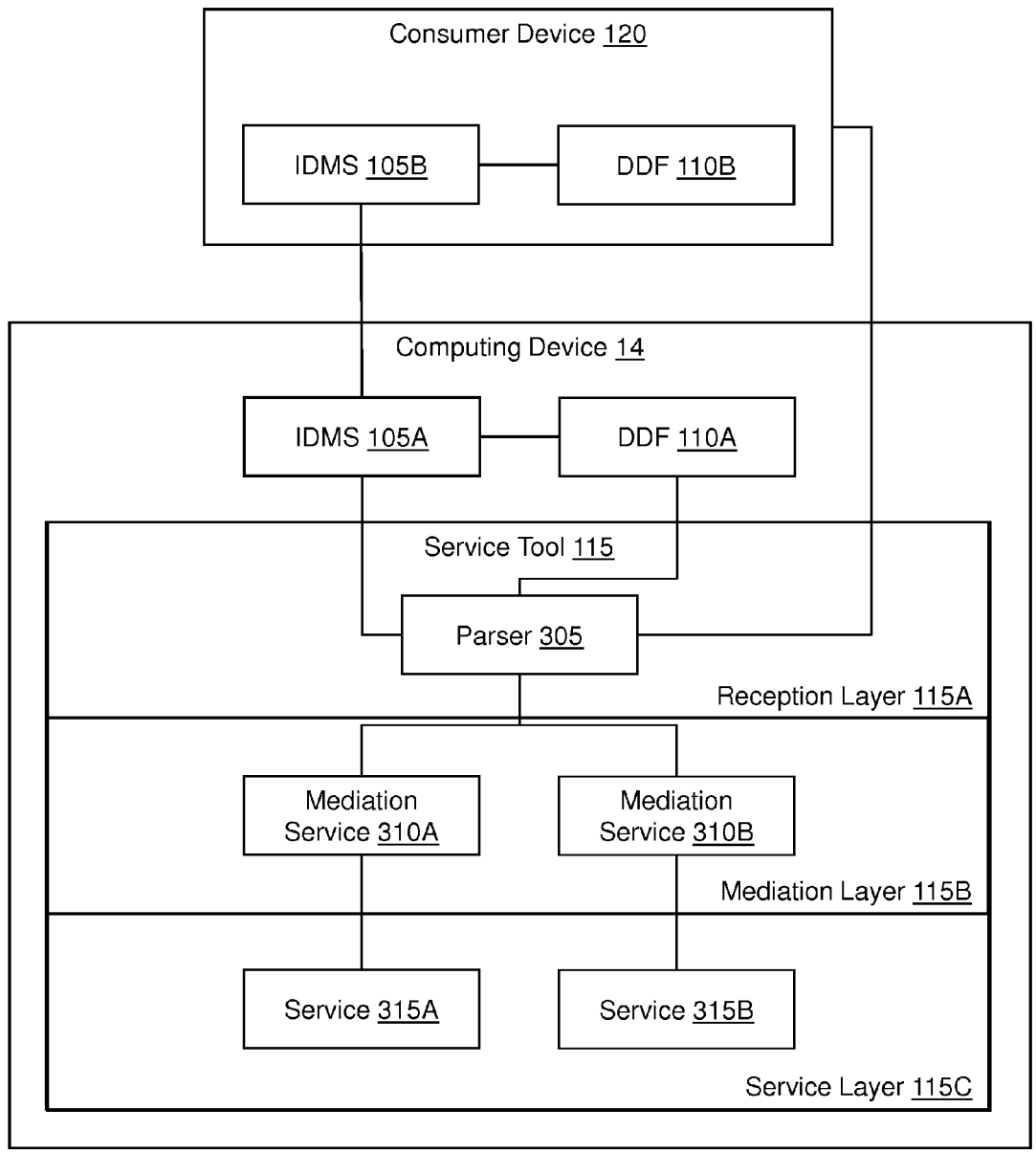
FIG. 3 shows an illustrative computing device and an illustrative consumer device of the environment in FIG. 1 in accordance with aspects of the invention.

FIG. 3 shows the computing device 14 and the consumer device 120 in FIG. 1 in accordance with aspects of the invention. In embodiments, the computing device 14 can include an intelligent data manager for Services-Oriented Architecture (SOA) (IDMS) 105A, e.g., the IDMS 105 in FIG. 1. The IDMS 105A may be used by a user or service designer of the computing device 14 to define one or more specific elements (e.g., a product, product items, and/or any type of data) of a SOA service (e.g., an online store and/or any type of SOA service). The elements may be defined in an interface (e.g., a Web Services Description Language (WSDL) file) for the service and in a standards style pattern. That is, local elements of the service (e.g., elements defined for only the single service) may be defined (e.g., detailed) in the interface, while common elements of the service (e.g., elements defined for multiple services) may be defined in a library (e.g., a WSDL file) of common elements for multiple services and may be referred to (e.g., not detailed) in the interface. While the local elements defined in the interface may be defined to be mandatory for the service in respective attributes of the local elements, the common elements defined in the library cannot be defined to be mandatory for any services since the common elements may be mandatory for some services but optional for other services.

In embodiments, when the service elements are defined in the interface and in the standards style pattern, the IDMS 105A can prompt the user to configure, via the IDMS 105A, a data definition file (DDF) 110A for the service to define the service elements including the local elements and the common elements. More specifically, in embodiments, the IDMS 105A may configure the DDF 110A to define a data optionality attribute of each of the service elements, e.g., whether each of the service elements is mandatory or optional for the service. The DDF 110A may include a WSDL file.

In accordance with further aspects of the invention, to provide a service element interface to the consumer device 120, the IDMS 105A can transfer the defined interface (e.g., the first WSDL file), the library of the common elements (e.g., the second WSDL file), and the defined DDF 110A (e.g., the third WSDL file) to the consumer device 120. In additional embodiments, the consumer device 120 may include an IDMS 105B (e.g., the IDMS 105 in FIG. 1) as, e.g., a client application, which may receive the defined interface, the library, and the defined DDF 110A from the computing device 14. The IDMS 105B may store the received interface, the library, and the received DDF 110A (as a DDF 110B), in memory of the consumer device 120. The IDMS 105A and/or the IDMS 105B may create one or more virtual links between the common elements referred to in the interface and the service elements defined in the DDF 110A and/or 110B, respectively.

In embodiments, the consumer device 120 can provide a consumer, e.g., a graphical user interface (GUI) for use of the SOA service based on the interface of the mandatory service elements and the DDF 110B of the service elements. In response, the consumer, via the GUI, may enter a value for each of the service elements. The consumer device 120 and/or the IDMS 105B may transfer these service element values in a service message (e.g., in the Extensible Markup Language (XML)) to the service tool 115 which may validate (e.g., approve and use) or invalidate (e.g., disapprove and remove) the service message.

In accordance with further aspects of the invention, the service tool 115 can include a reception layer 115A, a mediation layer 115B, and a service layer 115C. The reception layer 115A may include a parser 305. The mediation layer 115B may include one or more mediation services, such as, e.g., mediation services 310A and 310B. The service layer 115C may include one or more SOA services, such as, e.g., services 315A and 315B.

In embodiments, the parser 305 can receive the service message from the consumer device 120 and/or the IDMS 105B. The parser 305 may validate as mandatory for the service or invalidate as optional for the service, the service elements in the service message based on the interface defined by the IDMS 105A and the DDF 110A. To accomplish this, in embodiments, the parser 305 may work with the IDMS 105A when the parser 305 is parsing a common element referred to in the service message and the interface. The IDMS 105A may connect the parser 305 to the same common element, if available, defined in the DDF 110A based on the created virtual links between the common elements referred to in the interface and the service elements defined in the DDF 110A.

In accordance with further aspects of the invention, the parser 305 may validate or invalidate the common element referred to in the service message and the interface based on the same common element being defined in the DDF 110A, namely, whether the common element is mandatory or optional for the service. When the same common element is defined in the DDF 110A as mandatory, the parser 305 may validate the common element referred to in the service message and the interface as mandatory. Otherwise, the parser 305 may invalidate the common element referred to in the service message and the interface as optional. Advantageously, the service tool 115 may validate a service message for data optionality at an earlier stage (e.g., the reception layer 115A) of the service. In addition, the service tool 115 may also invalidate an incomplete or incorrect service message for data optionality at an earlier stage of the service, thus enabling earlier upstream filtering of service messages.

In embodiments, each of the mediation services 310A and 310B can receive the validated service message from the parser 305. Advantageously, the present invention prevents incomplete or incorrect services messages from percolating down to later stages (e.g., the mediation layer 115B) of the service and from forcing the mediation services 310A and 310B to have to consume their resources and validate the service messages. Each of the mediation services 310A and 310B may further adapt (e.g., edit) data structures and semantics of the validated service message to comply with the services (e.g., the services 315A and 315B) provided by the service tool 115. Each of the services 315A and 315B may receive the adapted service message from the mediation services 310A and 310B, and provide an SOA service (e.g., an online store) to the consumer based on the service elements (e.g., data) in the service message.

Figure 4:
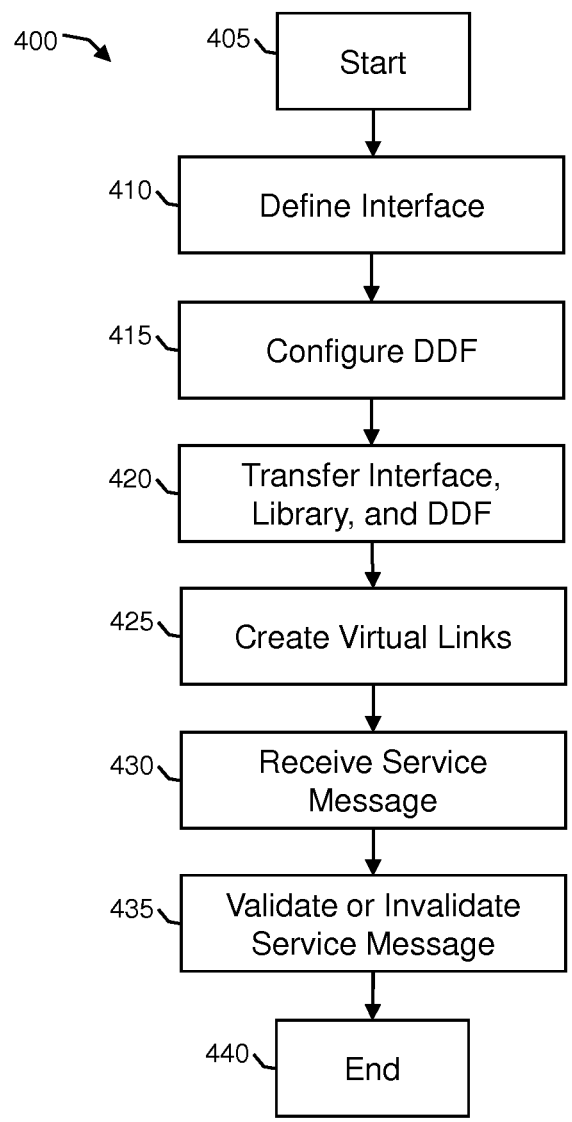
FIG. 4 shows an illustrative flow in accordance with aspects of the invention.

FIG. 4 shows an illustrative flow for performing aspects of the present invention. The steps of FIG. 4 may be implemented in the environment of FIG. 1, for example.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 4 depicts a flow for a process 400 in accordance with aspects of the present invention. The process 400 involves the computing device 14 in FIG. 3, namely, the IDMS 105A and the parser 305. The process 400 is performed to validate a service message for data optionality at an earlier stage (e.g., the reception layer 115A in FIG. 3) of the service. At step 405, the process starts.

At step 410, the IDMS can define an interface (e.g., a Web Services Description Language (WSDL) file) which includes one or more specific elements (e.g., a product, product items, and/or any type of data) of a Services-Oriented Architecture (SOA) service (e.g., an online store and/or any type of SOA service). At step 415, when the service elements defined in the interface are defined in the standards style pattern, the IDMS may configure a data definition file (DDF) (e.g., a Web Services Description Language (WSDL) file) for the service to define the service elements including the local elements and the common elements. More specifically, in embodiments, the IDMS may configure the DDF to define a data optionality attribute of each of the service elements, e.g., whether each of the service elements is mandatory or optional for the service. At step 420, to provide a service element interface to a consumer device, the IDMS may transfer the interface (e.g., the first WSDL file), a library of common elements for multiple services (e.g., a second WSDL file), and the DDF (e.g., the third WSDL file) to the consumer device.

At step 425, the IDMS can create one or more virtual links between the common elements referred to in the interface and the service elements defined in the DDF. At step 430, the parser may receive a service message (e.g., in the Extensible Markup Language (XML)) which includes the service element and respective values, from the consumer device. At step 435, the parser may validate (e.g., approve and use) or invalidate (e.g., disapprove and remove) the service message. More specifically, in embodiments, the parser may validate as mandatory for the service or invalidate as optional for the service, the service elements in the service message based on the interface and the DDF. To accomplish this, for example, when the parser is parsing a common element referred to in the service message and the interface, the IDMS may connect the parser to the same common element, if available, defined in the DDF based on the created virtual links between the common elements referred to in the interface and the service elements defined in the DDF. The parser may validate or invalidate the common element referred to in the service message and the interface based on the same common element being defined in the DDF, namely, whether the common element is mandatory or optional for the service. At step 440, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology and provides or utilizes services. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure, comprising:

defining an interface comprising one or more local data elements and one or more references to one or more common data elements, of a service, the one or more common data elements being defined in a library for a plurality of services, wherein the one or more common data elements are not defined in the library as being mandatory for any of the plurality of services;

configuring a data definition file (DDF), the configuring comprising defining an optionality attribute for each of the one or more local data elements and the one or more common data elements as mandatory for the service; and validating the one or more common data elements from the service message as mandatory for the service based on the interface and the configured DDF, wherein:

the validating comprises determining that one or more virtual links exists between one or more references to the one or more common data elements in the interface and the one or more common data elements defined in the DDF; and the validating is performed in a reception layer of the service that receives the one or more data elements from a computing device.

2. The method of claim 1, wherein the configuring of the DDF is performed after the defining of the interface.

3. The method of claim 1, wherein the DDF comprises a Web Services Description Language (WSDL) file.

4. The method of claim 1, further comprising connecting the one or more common data elements to the DDF based on the one or more virtual links.

5. The method of claim 1, further comprising invalidating the one or more common data elements as optional for the service based on the interface and the configured DDF.

6. The method of claim 1, wherein a service provider at least one of creates, maintains, deploys, and supports a computer infrastructure operable to the steps of claim 1.

7. The method of claim 1, wherein the steps of claim 1 are provided by a service provider on a subscription, advertising, and/or fee basis.

8. The method of claim 1, wherein the reception layer is located between the computing device and a service layer of the service.

9. The method of claim 8, further comprising creating the one or more virtual links via a consumer device coupled to the computing device.

10. The method of claim 9, further comprising creating a value via the consumer device for at least one of the one or more local data elements and at least one of the one or more common data elements.

11. A system implemented in hardware, comprising:
a computer infrastructure operable to:
define an interface comprising one or more local data elements and one or more references to one or more common data elements, of a service, the one or more common data elements being defined in a library for a plurality of services, wherein the one or more common data elements are not defined in the library as being mandatory for any of the plurality of services;
configure a data definition file (DDF) comprising one or more data optionality attributes which indicate whether each of the one or more local data elements and the one or more common data elements is optional for the service; and
invalidate the one or more common data elements from the service message as optional for the service based on the interface and the configured DDF, wherein:

the invalidation comprises determining that the one or more references to the one or more common data elements in the interface is not defined in the DDF; and the invalidation is performed in a reception layer of the service that receives the one or data elements from the consumer device.

12. The system of claim 11, wherein the computer infrastructure is further operable to validate the one or more common data elements as mandatory for the service based on the interface and the configured DDF.

13. The system of claim 11, wherein the reception layer is located between the computing device and a service layer of the service.

14. The system of claim 13, further comprising the computer infrastructure being operable to create one or more virtual links between one or more references to the one or more common data elements in the interface and the one or more common data elements in the configured DDF via a consumer device coupled to the computing device.

15. The system of claim 14, further comprising creating a value via the consumer device for at least one of the one or more local data elements and at least one of the one or more common data elements.

16. A computer program product comprising a non-transitory tangible computer usable storage medium having readable program code embodied in the tangible computer usable storage medium, the computer program product includes at least one component operable to:
define an interface comprising one or more local data elements and one or more references to one or more common data elements, of a service, the one or more common data elements being defined in a library for a plurality of services, wherein the one or more common data elements are not defined in the library as being mandatory for any of the plurality of services; and
configure a data definition file (DDF), the configuring comprising defining an optionality attribute for each of the one or more local data elements and the one or more common data elements as mandatory for the service;
validate the one or more common data elements from the service message as mandatory for the service based on the interface and the configured DDF, wherein:
the validating comprises determining that one or more virtual links exists between one or more references to the one or more common data elements in the interface and the one or more common data elements defined in the DDF; and
the validation is performed in a reception layer of the service that receives the one or more data elements from a computing device.

17. The computer program product of claim 16, wherein the reception layer is located between the computing device and a service layer of the service.

18. The computer program product of claim 17, further comprising creating the one or more virtual links via a consumer device coupled to the computing device.

19. The computer program product of claim 18, further comprising creating a value via the consumer device for at least one of the one or more local data elements and at least one of the one or more common data elements.

* * * * *